(12) United States Patent
Burge et al.

(10) Patent No.: US 6,167,657 B1
(45) Date of Patent: *Jan. 2, 2001

(54) WEATHERSTRIP PRODUCT FORMED BY SEQUENTIAL EXTRUSION OF CELLULAR AND NON-CELLULAR PLASTIC RESINS

(75) Inventors: Gary Burge, Hewitt, TX (US); Robert Pauley, Troutdale, VA (US)

(73) Assignee: Marley Mouldings, Inc., Marion, VA (US)

( * ) Notice: This patent issued on a continued prosecution application filed under 37 CFR 1.53(d), and is subject to the twenty year patent term provisions of 35 U.S.C. 154(a)(2).

Under 35 U.S.C. 154(b), the term of this patent shall be extended for 0 days.

(21) Appl. No.: 08/959,914

(22) Filed: Oct. 29, 1997

Related U.S. Application Data

(60) Provisional application No. 60/031,342, filed on Nov. 21, 1996, and provisional application No. 60/052,360, filed on Jul. 11, 1997.

(51) Int. Cl.[7] ............... E06B 7/232; B29C 47/00; B29D 7/00
(52) U.S. Cl. .................... 49/496.1; 156/244.11; 156/244.26; 264/45.9
(58) Field of Search ............ 49/496.1; 264/45.9, 264/46.1; 156/244.11, 244.19, 244.26, 244.22

(56) References Cited

U.S. PATENT DOCUMENTS

| 3,535,824 | 10/1970 | Kessler | 49/488 |
|---|---|---|---|
| 3,685,206 | 8/1972 | Kessler | 49/489 |

(List continued on next page.)

FOREIGN PATENT DOCUMENTS

| 0 805 013 | 11/1997 | (EP) | B29C 47/02 |
|---|---|---|---|
| 2 378 935 | 8/1978 | (FR) | E06B 7/23 |
| 2183707 | 6/1987 | (GB) | E06B 7/23 |
| WO 88/03863 | 6/1988 | (WO) | B29C 47/02 |
| WO 90/08639 | 8/1990 | (WO) | B29C 47/02 |

OTHER PUBLICATIONS

Stedfield, Robert; "Dual and Coextrusion: The Happy Marriage of Two Unlike Plastics"; *Modern Extrusion*, Feb. 1979; pp. 51–55.
Collection of Brochures (4 pages) showing "Victorian Molding" product of Gossen Corporation, dated 1980.
Collection of Brochures (4 pages) showing "Thermo*Stop" product of Marley Mouldings Inc., dated 1995 and earlier.
Brochure showing "Jambseal" product of Gossen Corporation, dated 1990.
"Hart–Weich Nacheinander Rigid and Non–Rigid In succession" —vol. 85, No. 1, Jan. 1, 1995, p. 97/98.
Japanese Patent Abstract—No. JP 55 039348—Dated: Mar., 19.
European Search Report—EP 97 30 9426—Mar. 6, 1998 Annex To The European Search Report.

*Primary Examiner*—Alvin Chin-Shue
*Assistant Examiner*—Hugh B. Thompson
(74) *Attorney, Agent, or Firm*—Sidley & Austin; Hugh A. Abrams

(57) ABSTRACT

An extrusion product or profile is formed by extrusion of a cellular compound to form a base and then subsequent extrusion of a non-cellular compound to form an attached flexible strip. The final product or profile is used as a garage door weatherstrip in which the cellular base is mounted against the door jamb and the strip of flexible non-cellular material extends out from the cellular base to prevent the flow of air through openings between doors and adjacent jambs or frames.

The process for forming such a product involves sequential extrusion of the two portions of the product. First, a cellular base is extruded through a die and vacuum sizer and allowed to cool. Next, a saddle die is used to apply the flexible non-cellular strip to a portion of the cellular base.

10 Claims, 2 Drawing Sheets

U.S. PATENT DOCUMENTS

| | | | |
|---|---|---|---|
| 3,764,642 | 10/1973 | Boutillier | 264/47 |
| 4,322,260 | 3/1982 | Conlon | 156/244 |
| 4,383,812 | 5/1983 | Calcagni | 425/133.1 |
| 4,600,461 | 7/1986 | Guy | 156/244.12 |
| 4,690,862 | 9/1987 | Hoffman | 428/318.6 |
| 5,092,079 | 3/1992 | Brookman et al. | 49/496 |
| 5,508,103 | 4/1996 | Cope | 428/318.8 |
| 5,538,777 | 7/1996 | Pauley et al. | 428/122 |

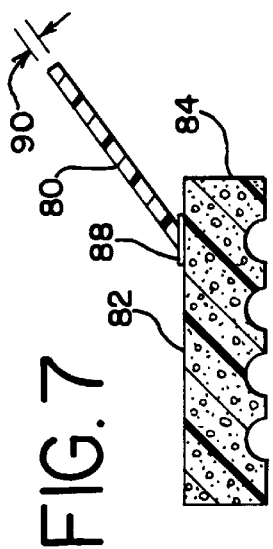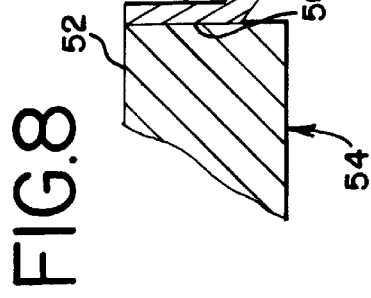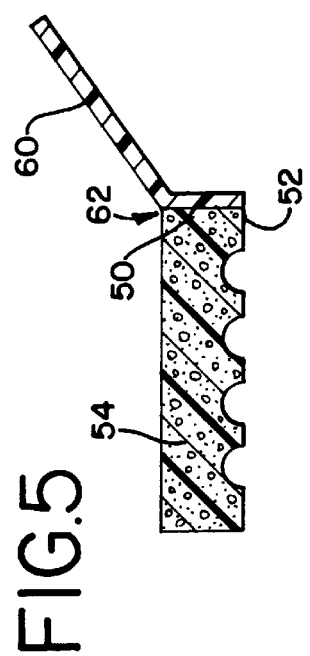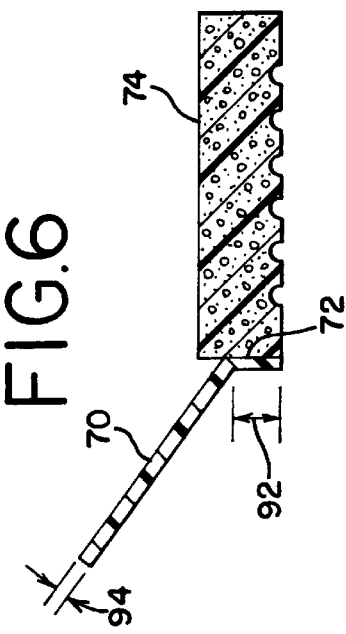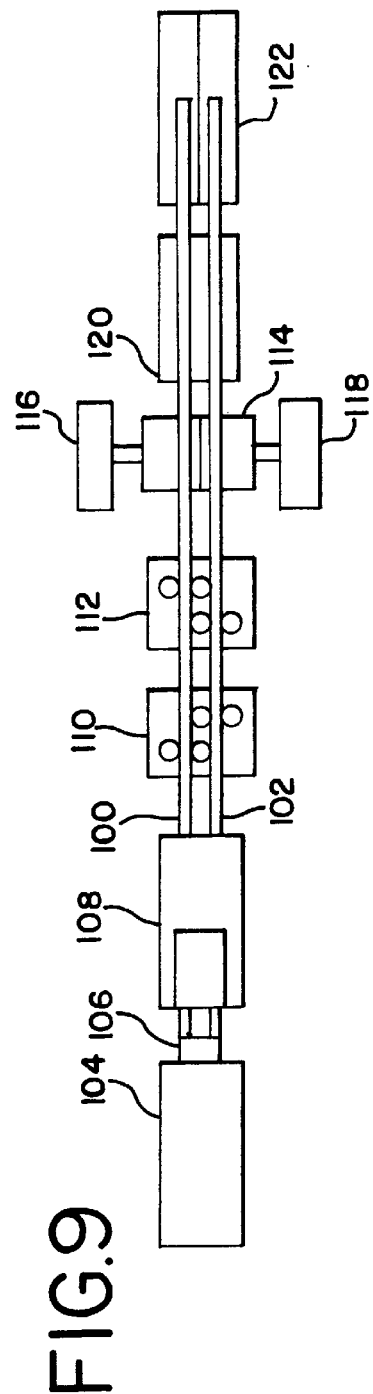

WEATHERSTRIP PRODUCT FORMED BY SEQUENTIAL EXTRUSION OF CELLULAR AND NON-CELLULAR PLASTIC RESINS

Reference is made to U.S. Pat. No. 5,508,103, which is also directed to an extrusion product and is incorporated herein by reference. This application claims priority on provisional U.S. Application No. 60/031,342, filed Nov. 21, 1996, and provisional U.S. Application No. 60/052,360, filed Jul. 11, 1997, entitled "Weatherstrip Product Formed By Sequential Extrusion Of Cellular And Non-Cellular Plastic Resins," both of which are incorporated by reference.

BACKGROUND OF THE INVENTION

Weatherstrip products made by dual extrusion or coextrusion of cellular and non-cellular plastic resins are well-known in the art. Examples of such products are shown in U.S. Pat. No. 3,535,824 and U.S. Pat. No. 3,685,206 to Kessler. The Kessler patents disclose a dual extruded weatherstrip product having a rigid base with a flexible strip that is mechanically interlocked and thermally fused to the base.

The Kessler patents teach that the products are made by "well-known dual extrusion processes," which would include the standard processing techniques shown in, for example, Boutillier U.S. Pat. No. 3,879,505 or in Hoffman U.S. Pat. No. 4,690,862. Such standard processing techniques, are described in both Boutillier and Hoffman, as well as in numerous other references, and have been used to produce products that have been available commercially since at least the early 1980's (e.g., the Victorian Molding product made by Gossen Corporation). These processes involve the extrusion of cellular and non-cellular resins through separate extruders into a common die. The resins meet either inside or immediately upon exiting the die and then travel through a sizing box and cooling tank, which are typically under vacuum pressure conditions in order to maintain the size of the cellular plastic portion as the profile is cooled.

Both Kessler and Hoffman teach the use of a bulbous tongue to form a mechanical interlock between the two plastics, which is in addition to the thermal or chemical fusion that occurs between the plastics during the extrusion process. Hoffman, in particular, teaches that the bulbous tongue is important to maintain the tongue portion within the corresponding groove portion of the mating profile during the extrusion process and during use of the product. The assignee of the Hoffman patent, Gossen Corporation, has commercially sold weatherstrip product both with and without the bulbous tongue shown in the Hoffman patent.

The present invention provides a weatherstrip product for use in garage doors and similar applications in which the flexible portion is subjected to back and forth movements by the opening and closing of the garage door and therefore needs to be securely held by the mating portion. The present invention provides such a weatherstrip product, but avoids the use of the bulbous tongue configuration that is taught to be so important in the Hoffman patent.

Other prior art garage door weatherstrip products have been provided which eliminate the bulbous tongue, and thus any encapsulation of the tongue within the mating groove. These prior art products (e.g., the Thermo*Stop made by Marley Mouldings, the assignee of the present invention), use thermal fusion (but no mechanical interlock) to hold a flexible, non-cellular piece within a V-shaped groove in a cellular portion. While these prior art products provide a satisfactory garage door weatherstrip without the need for the bulbous tongue (and thus the encapsulation) taught in Hoffman, the present invention, in its preferred embodiment, avoids the formation of any groove in the cellular base for mating with the non-cellular strip. While other prior art weatherstrip products have utilized a non-cellular piece fixedly abutted against a cellular piece, or a non-cellular flap extruded along the surface of a cellular piece, one embodiment of the present invention provides an extended surface area of contact that allows use of the weatherstrip as a garage door weatherstrip product in which the flexible portion is repeatedly contacted or moved by the garage door or other external forces. An example of a prior art weather seal for a garage door with a solid base and a pivoting seal member is shown in U.S. Pat. No. 5,092,079. An example of a prior art weatherstrip with a cellular (foamed) portion and a solid, or non-cellular portion is shown in UK Patent Application GB 2,183,707.

An example of a prior art sequential extrusion process is shown in Guy U.S. Pat. No. 4,600,461. In that patent, a non-cellular piece is extruded onto the top of a cellular base before both portions are drawn through a sizing or cooling chamber. Another example of a prior art sequential extrusion process for extrusion forming of a thermoplastic, double-walled, foam-core conduit is shown in U.S. Pat. No. 4,322,260.

SUMMARY OF THE INVENTION

An extrusion product or profile is formed by extrusion of a cellular compound to form a base and then subsequent extrusion of a non-cellular compound to form an attached flexible strip. The final product or profile is used as a garage door weatherstrip in which the cellular base is mounted against the door jamb and the strip of flexible non-cellular material extends out from the cellular base to prevent the flow of air through openings between doors and adjacent jambs or frames.

The present invention also includes the process for forming such a product. The process involves sequential extrusion of the two portions of the product. First, a cellular base is extruded through a die and vacuum sizer and allowed to cool. Next, a saddle die is used to apply the flexible non-cellular strip to a portion of the cellular base. Preferably, the saddle die heats a portion of the cellular base to improve the bond between the cellular and non-cellular portions.

BRIEF DESCRIPTION OF THE DRAWINGS

In the drawings, which are not to scale,

FIG. 5 is a cross-sectional view of a second embodiment of the weatherstrip product of the present invention.

FIG. 6 is a cross-sectional view of a third embodiment of the weatherstrip product of the present invention.

FIG. 7 is a cross-sectional view of a fourth embodiment of the weatherstrip product of the present invention.

FIG. 8 is an illustration of the die cross-sectional configuration for one embodiment of the present invention, illustrating the area of contact of the cellular and non-cellular resins.

FIG. 9 is a schematic drawing of another embodiment of the process of the present invention.

DESCRIPTION OF THE PREFERRED EMBODIMENTS

Figure 2:
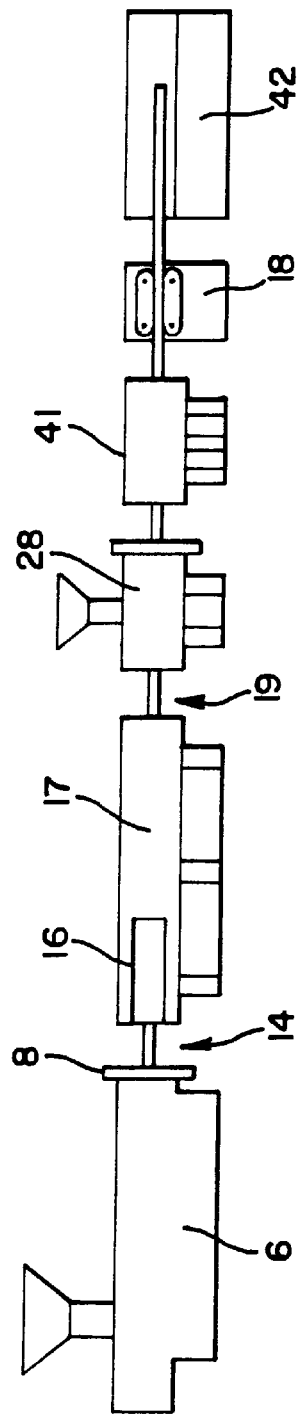
FIG. 2 is a schematic drawing of one embodiment of the process of the present invention.

As shown in FIGS. 5, 6 and 7, in each of several preferred embodiments, the product has a base that is formed by a conventional cellular extrusion process. The process is shown schematically in FIGS. 2 and 9, which are not to scale. A cellular resin is heated to a molten state and pushed by an extrusion screw through a conventional extruder 6 and then exits a die 8. The die is shaped to form a profile of the desired cross-sectional configuration (before expansion) of the cellular plastic portion or base 10. Typically, the cellular extrudate will have a rectangular configuration with ridges 12 along one side of the product, but ridges are not required.

After the compound exits the die 8, the cellular extrudate reaches open air and begins to expand or foam during travel through the distance 14 of approximately six to eight inches between the die and a sizing box. The extrudate then enters the sizing box 16, which is under vacuum draw to maintain the shape of the cellular material as it passes through the sizing box. The configuration of the entry to the sizing box has the same shape but is slightly larger than the exit of the die 8 in order to accommodate the expansion of the cellular extrudate in the space 14 between the die 8 and the sizing box 16.

The sizing box is submerged in a cold water tank 17. As the extrudate exits the sizing box, which is typically about 14 inches long, it continues through the remainder of the water tank 17, which is typically about 20 feet in length. The water tank is cooled in order to cool the cellular extrudate. Thus, when the cellular extrudate emerges from the water tank, the extrusion profile has substantially hardened and reached its full size, but may still have some retained heat within the profile. The expansion of the cellular product is accomplished by the formation of gas bubbles or cells within the extrusion product.

The extrusion product is typically pulled from the point of its exit from the die and through the sizing box 16 and tank 17. A puller 18, which is conventionally utilized downstream from the die and tank, acts to maintain a tension on the length of extrusion product from the die until the final cutting and finishing operation. An embossing wheel (not shown) may be used after the cellular product leaves the water tank to provide a simulated wood grain finish on the outside of the profile.

In the process of one embodiment of this invention, after the cellular product exits the water tank, a carbide blade (not shown) is used to cut a groove 20 along the length of the cellular piece. Thus, as the cellular extrudate travels through area 19 after its exit from the tank, a circular saw with carbide blade continuously cuts a groove or trough along the length of the product. The groove is positioned at a point along the width of the cellular piece to permit appropriate placement of the flexible non-cellular extrudate 22, as subsequently explained. Other types of saws or cutting mechanisms may also be used. For example, a cutting tool may be held and dragged along the profile to form the groove as the profile is pulled forward.

Figure 3:
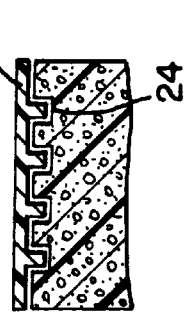
FIG. 3 is a schematic view of one embodiment of the product of the present invention, illustrating the non-cellular extrudate in the open cells of the cellular base.
Figure 1:
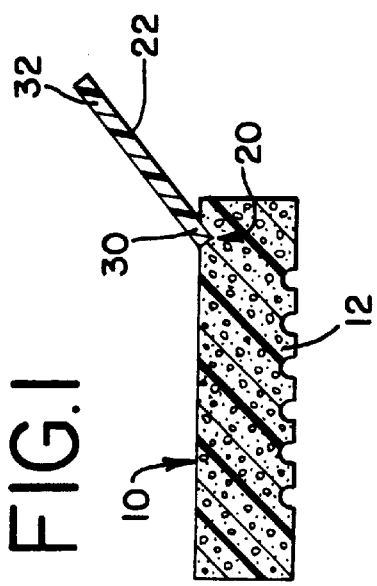
FIG. 1 is a cross-sectional view of one embodiment of the weatherstrip product of the present invention.

In the process of this embodiment, adhesion of the non-cellular product is promoted by cutting the groove sufficiently deep so that it cuts through any skin or hardened surface layer that might form on the outside of the cellular product as it cools as well as through the cell structure that is formed by the expansion of the cellular compound. The contact is shown schematically and substantially enlarged in FIG. 3, with the non-cellular resin 26 above and within the open cells of the cellular resin 24. The opening of the cells 24 by the cutting or formation of the groove will permit the flexible non-cellular extrudate 26 to flow into the cells and create a stronger bond.

In the preferred embodiments of the present invention, no groove is cut or otherwise formed in the cellular plastic portion. Instead, the adhesion between the non-cellular and cellular portions is accomplished by providing sufficient surface area of contact between the two portions. Alternatively, a groove may be integrally formed in the cellular base as it passes through the die and vacuum sizer.

After the cellular profile emerges from the cooling tank and passes under the embossing wheel, the profile passes beneath a second die 28 or saddle die from which the non-cellular extrudate is placed onto the cellular profile. The saddle die may also be below or alongside the cellular profile, as desired. At this point, the cellular profile is generally cooled, but will most likely have some retained or residual heat. The flexible, non-cellular compound or resin is fed from a second extruder through the saddle die 28 and along the length of the cellular profile. The flexible resin is applied so that one end 30 of the width of flexible strip is placed along the cellular piece. The other end 32 of the width of the flexible piece extends upward and away from the cellular portion 10 in order to form the strip portion 22 of the weatherstrip.

In one embodiment, the saddle die is formed in two connected portions. The first portion is approximately one inch thick and the second portion is approximately one-quarter inch thick. These die dimensions will vary based on the formulations and sizes of the profiles formed. In this embodiment, the saddle die is positioned so that one side 50 and one corner 52 of the cellular piece 54 pass in contact with the first portion of the saddle die. The flexible, non-cellular resin also passes through this first portion of the saddle die, but is kept separate from the cellular resin in this die portion.

Both the cellular and non-cellular resins are heated in the first die portion. The non-cellular resin is heated to maintain its flowability as it will be added to the cellular portion. The cellular portion is also heated along the side on which the non-cellular portion will be attached. Heating of both the cellular and non-cellular is believed to be important in order for the proper adhesion of the non-cellular flexible piece to the cellular base in some embodiments and applications.

Both the cellular and non-cellular resins then pass into the second portion of the saddle die illustrated in FIG. 8. In this portion, the opening 58 next to the cellular resin is shaped so that the non-cellular resin flows into the proper configuration against the side of the cellular resin. In this die portion, the two resins contact and are joined.

After leaving the saddle die, both resins pass through a cooling fixture 41. In one embodiment of the fixture, cold water flows along both the non-cellular and cellular portions to cool the profile. In another embodiment of the fixture, cold water and cold air both contact the profile to cool the product. In one embodiment, the cooling fixture is approximately 15 inches long. No sizing box is necessary in this portion of the process.

After leaving the cooling fixture, the product is cut to the appropriate length along a cutting table 42. Embossment of the cellular portion was previously completed, so no further embossment is necessary or performed.

It is important to note that the flexible compound is in a hot molten state (approximately 330° F.) as it leaves the saddle die 28 and contacts the cellular portion. The heat from the flexible compound should cause at least some portion of the cells in the cellular profile to heat and partially liquefy. However, it is also believed to be important to the present process to have the cellular portion heated immediately prior to the contact with the non-cellular resin. Such heating preferably provides the cellular resin with a somewhat soft, tacky surface, but not pure liquid or molten resin. Such a surface improves the bonding between the flexible and cellular without affecting the integrity of the cellular profile.

Figure 4:
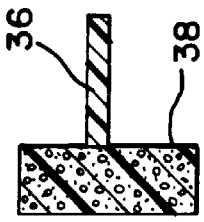
FIG. 4 is a schematic view of a prior art weatherstrip having non-cellular and cellular portions.

It is noted that saddle dies have previously been utilized to place a flexible non-cellular compound along a portion of a cellular profile. Such extrusions are typically utilized in window frames in which the flexible extrusion extends outward from the cellular base to hold a window pane in position. However, in such previous applications, the flexible portion is moved only during the insertion of the window into the frame. Unlike the doorstop application of the present invention, the flexible portion is not repeatedly moved in a hinge-like manner. Since the flexible portion 36 in these applications is not repeatedly moved, it may be attached or bonded to the outer, uncut surface 38 of the cellular profile, as shown in FIG. 4. The flexible portion is also not placed along a substantial portion of the top of the base or along the side of the base.

Any extrudable material may be used with the present process. The preferred materials include polyvinyl chloride and polystyrene. Other extrudable materials, such as acrylonitrile-butadiene-styrene (ABS), may also be used. The cellular compound may be made of the same or a different material than the non-cellular compound. However, the cellular material includes a conventional blowing agent to cause foaming or expansion of the cellular material. Blowing agents are well-known in the extrusion art. The extrusion materials may contain other plasticizers, fillers and pigments, as known and used by those skilled in the extrusion art.

One preferred embodiment of the profile of the present invention is shown in FIG. 5. The flexible, non-cellular portion 60 has a length that extends from a first end along the entire side 50 of the cellular portion 54. The length extends upward from the top corner 62 of the cellular portion to a second end of the flexible portion. Only a portion of the entire length of the flexible strip is firmly attached to the rigid base. In another embodiment, shown in FIG. 6, a portion of the length of the flexible portion 70 extends along only a portion of the side 72 of the cellular portion 74. In yet another embodiment, shown in FIG. 7, the flexible portion 80 extends upward from the top 82 of the cellular portion. In each of these embodiments, the flexible portion preferably extends along the surface of the cellular portion for a length that is greater than the thickness of the flexible portion.

Satisfactory profiles for commercial use as a garage doorstop have been made of the embodiment shown in FIG. 7 with the flexible portion 80 being attached to the cellular portion 84 in a width 88 of approximately twice the width 90 of the flexible portion. Satisfactory profiles for commercial use as a garage doorstop have been made of the embodiment in FIG. 6 in which the flexible portion 70 extends along the side 72 of the cellular portion for a distance 92 that is approximately four times the thickness 94 of the flexible portion.

A dual strand or twin strand production line is shown schematically in FIG. 9. In that line, two parallel extrusions 100, 102, are produced by a sequential extrusion process. A main extruder 104 extrudes the cellular resin through a hot die 106 into two parallel streams. Both streams enter the vacuum tank 108 in which they are cooled. After leaving the tank 108, the cellular resin is at least partially cooled and therefore proceeds through embosser 110 and puller 112.

The second stage of the extrusion process is through saddle die 114. Two separate extruders 116, 118 feed the non-cellular resin to the saddle die 114. The streams leave the saddle die with the flexible, non-cellular strip attached to the cellular base. The resins are cooled in the cooling fixture 120 and then cut to size on a cut-off table 122.

Those skilled in the art to which the invention pertains may make modifications and other embodiments employing the principles of this invention without departing from its spirit or essential characteristics, particularly upon the foregoing teachings. The described embodiments are to be considered in all respects only as illustrative and not restrictive, and the scope of the invention is, therefore, indicated by the appended claims rather than by the foregoing description. Consequently, while the invention has been described with reference to particular embodiments, modifications of structure, sequence, materials and the like would be apparent to those skilled in the art, yet still fall within the scope of the invention.

What is claimed is:

1. A method of forming an extruded weatherstrip profile for a garage door having a rigid cellular base portion and a flexible non-cellular strip portion, comprising the steps of:

extruding a cellular material through a first die, hardening said cellular material into a rigid weatherstrip base portion after exiting said first die, said base portion having at least one exterior top surface and at least one exterior side surface, extruding a non-cellular material through a second die, at least a portion of said non-cellular material contacting at least one of said exterior surfaces of said base portion, hardening said non-cellular material into a flexible strip portion after exiting said second die, said strip portion having first and second ends, a length extending from said first end to said second end, and a thickness, firmly attaching a portion of said length of said strip portion at said first end of said strip portion to and extending parallel along only said one of said exterior surfaces of said base portion, said strip portion having a second end extending freely outward from said base portion.

2. The method of claim 1 wherein said attached portion of said length of said strip portion is of a length at least twice greater than said thickness of said strip portion.

3. The method of claim 1 further comprising the step of heating at least a portion of said cellular material of said base portion inside said second die.

4. The method of claim 3 further comprising the step of heating said non-cellular material inside said second die.

5. The method of claim 1 wherein said cellular material hardening step includes passing said cellular material through a sizing box under vacuum pressure.

6. The method of claim 5 wherein said cellular material hardening step includes passing said cellular material through a cooling fixture.

7. The method of claim 6 wherein said hardening step includes cooling said cellular material, said cellular material exiting said cooling fixture and said non-cellular material contacting said cellular material before said cellular material is cooled to room temperature.

8. The method of claim 1 further comprising the steps of:

forming an integral groove in said cellular base portion during said extruding and said hardening steps, said contacting of said non-cellular material with said one of said surfaces of said base portion being along said groove in said base portion.

9. The method of claim 8 wherein said exit die has an orifice configured to form said integral groove in said cellular material.

10. The method of claim 1 wherein said strip portion extends across the entire length of said side surface of said base portion.

* * * * *